C. K. MITCHELL.
BAG HOLDERS

No. 116981      Patented JUL 11 1871

ATTEST
Myron H. Church
J. Combs

INVENTOR
Charles K. Mitchell
per Atty
Thos. S. Sprague

UNITED STATES PATENT OFFICE.

CHARLES K. MITCHELL, OF GREENVILLE, MICHIGAN.

IMPROVEMENT IN BAG-HOLDERS.

Specification forming part of Letters Patent No. 116,981, dated July 11, 1871.

*To all whom it may concern:*

Be it known that I, CHARLES K. MITCHELL, of Greenville, in the county of Montcalm and State of Michigan, have invented a new and useful Improvement in Bag-Holders; and I do declare that the following is a true and accurate description thereof, reference being had to the accompanying drawing and to the letters of reference marked thereon, and being a part of this specification, in which—

Figure 1:
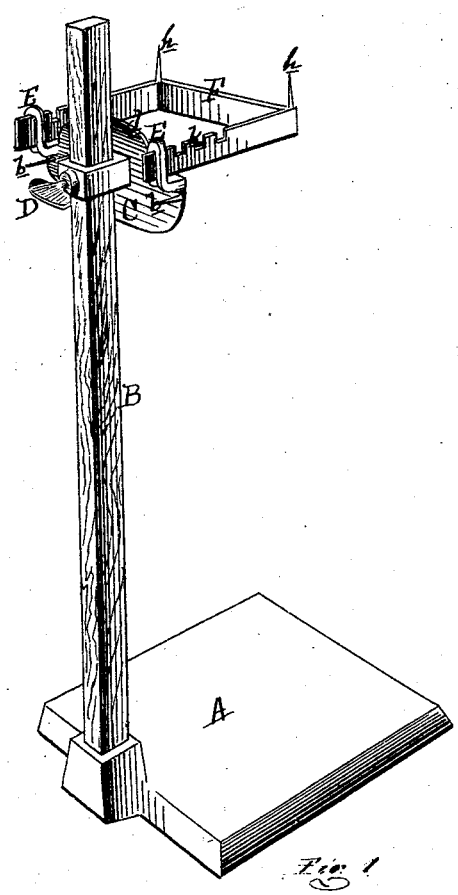
Figure 2:
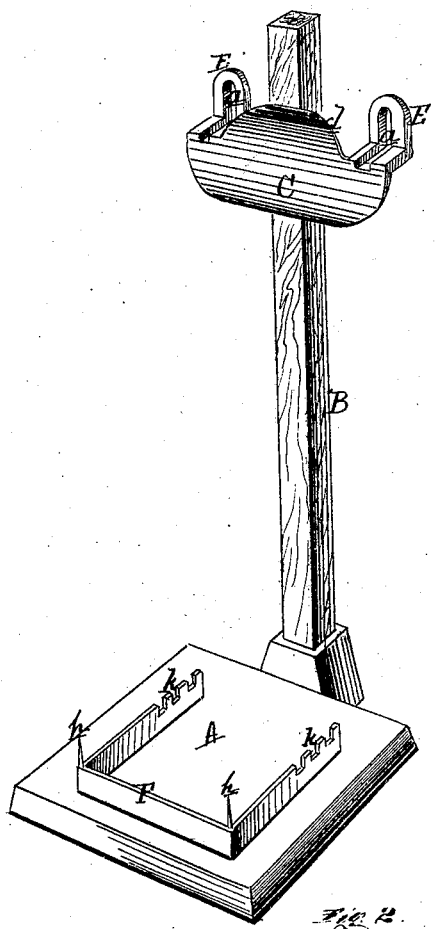

Figure 1 is a perspective. Fig. 2 is a perspective with the bale removed, and shown detached.

Like letters refer to like parts in each figure.

The nature of this invention relates to the construction of a device for holding open the mouths of sacks and bags while being filled, so arranged as to be adjustable in height, as may be required by the length of the bag, while at the same time the bale is so adjustable that it may be made to conform to the various sizes of the mouths of the sacks. The invention consists in the new and novel arrangement of the various parts for the above-named purposes, and as more fully hereinafter described.

In the accompanying drawing, A represents a base from which rises a standard, B, upon which the plate C is sleeved, by any suitable device, and adjustable vertically upon said standard by means of the set-screw D. Ears E project rearward and upward from this plate, and are provided with slots $a$ to receive, guide, and hold the bale F. Below the ears, and projecting from the rear side of this plate, are the spurs $b$, upon which to hang the sack or bag. This plate should be substantially of the form shown, so that the projection $d$ will act as a shield and guide to prevent grain or other substances which are being shoveled into the bag from falling behind the device, and guide said grain into the bag. F is a bale, made of any suitable material, provided with spurs $h$ upon which to hang the opposite sides of the bag, and also provided with notches $k$. The arms of the bale being inserted in the slots $a$, the bag should be hung outside the bale upon the spurs $b$ $h$, when the bale may be drawn out until the mouth of the bag is fully distended, when the notches $k$, engaging with the upper portion of the slots in the ears, will hold it while being filled.

The operation of this device is so simple that a lengthy description thereof is deemed unnecessary.

I am aware that adjustable bag-holders are known and in use. I utterly disclaim any part thereof; but

What I claim as my invention, and desire to secure by Letters Patent, is—

The bag-holder, constructed substantially as described, wherein the plate C and bale F are combined with base A, standard B, and set-screw D, all constructed and arranged substantially as and for the purposes set forth.

CHARLES K. MITCHELL.

Witnesses:
JNO. ARMS,
C. M. MARTIN.